US011359715B2

(12) United States Patent
Margraf et al.

(10) Patent No.: US 11,359,715 B2
(45) Date of Patent: Jun. 14, 2022

(54) TRANSMISSION SHAFT, TRANSMISSION, AND MOTOR VEHICLE DRIVETRAIN

(71) Applicant: ZF Friedrichshafen AG, Friedrichshafen (DE)

(72) Inventors: Christoph Margraf, Markdorf (DE); Carl Schilling, Weingarten (DE); Martin Brehmer, Tettnang (DE); Oliver Angele, Weingarten (DE); Manuel Steinmann, Gersheim (DE); Sebastian Freis, Etzling (FR); Stefan Benz-Breitweg, Wolfegg (DE); Robert Reiser, Nenzingen (DE); Christian Staiger, Immenstaad (DE); Felix Fink, Friedrichshafen (DE); Tamas Gyarmati, Bermatingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 142 days.

(21) Appl. No.: 16/796,128

(22) Filed: Feb. 20, 2020

(65) Prior Publication Data
US 2020/0271213 A1 Aug. 27, 2020

(30) Foreign Application Priority Data
Feb. 22, 2019 (DE) .................... 10 2019 202 447.5

(51) Int. Cl.
*F16D 25/10* (2006.01)
*F16H 57/04* (2010.01)
(Continued)

(52) U.S. Cl.
CPC ............. *F16H 57/043* (2013.01); *F16C 3/02* (2013.01); *F16D 25/10* (2013.01); *F16D 33/18* (2013.01);
(Continued)

(58) Field of Classification Search
CPC ................ F16D 25/10; F16D 48/0206; F16D 2048/0224
See application file for complete search history.

(56) References Cited

U.S. PATENT DOCUMENTS 9,194,482 B2  11/2015  Goleski et al.
9,528,436 B2  12/2016  Kasuya et al.
(Continued)

FOREIGN PATENT DOCUMENTS

DE  102013219631 A1  4/2014
DE  112013000259 T5  9/2014
(Continued)

OTHER PUBLICATIONS

German Search Report DE102019202447.5 dated Sep. 5, 2019. (12 pages).

*Primary Examiner* — Huan Le
(74) *Attorney, Agent, or Firm* — Dority & Manning, P.A.

(57) ABSTRACT

A shaft (W) for a motor vehicle transmission (G) may have axial bore holes positioned within the shaft and configured to guide fluid within the shaft. The shaft may have first, second, and third axial sections (W1, W2, W3), the second axial section being axially between the first and third axial sections. Fluid enters the axial bore holes in the second axial section and exits the axial bore holes in the first and third axial sections. One of the axial bore holes (B2; B1, B1a) is arranged, at least partially, in the first axial section and is radially spaced from an axis of rotation (WA) of the shaft. Another of the axial bore holes (B1RS; B_SE5, B3a) is arranged, at least partially, in the third axial section. The one of the axial bore holes (B2; B1, B1a) is coaxial with the other of the axial bore holes (B1RS; B_SE5, B3a).

16 Claims, 10 Drawing Sheets

(51) Int. Cl.
*F16C 3/02* (2006.01)
*F16D 48/02* (2006.01)
*F16H 63/30* (2006.01)
*F16D 33/18* (2006.01)

(52) U.S. Cl.
CPC ..... *F16D 48/0206* (2013.01); *F16H 57/0473* (2013.01); *F16H 63/3026* (2013.01); *F16C 2326/06* (2013.01); *F16D 2048/0224* (2013.01); *F16H 57/0484* (2013.01)

(56) References Cited

U.S. PATENT DOCUMENTS

| | | | |
|---|---|---|---|
| 9,945,472 B2 | 4/2018 | Yamada et al. | |
| 10,001,206 B2 | 6/2018 | Fujii et al. | |
| 10,160,305 B2 * | 12/2018 | Kasuya | B60K 6/44 |
| 10,161,509 B2 * | 12/2018 | Beck | F16H 61/0021 |
| 2006/0191746 A1 * | 8/2006 | Diosi | F16C 3/02 |
| | | | 184/6.18 |
| 2017/0016515 A1 | 1/2017 | Torii et al. | |

FOREIGN PATENT DOCUMENTS

| | | |
|---|---|---|
| DE | 112015000919 T5 | 11/2016 |
| DE | 102016123213 A1 | 6/2017 |
| JP | 2015197150 A | 11/2015 |
| JP | 2015197151 A | 11/2015 |

\* cited by examiner

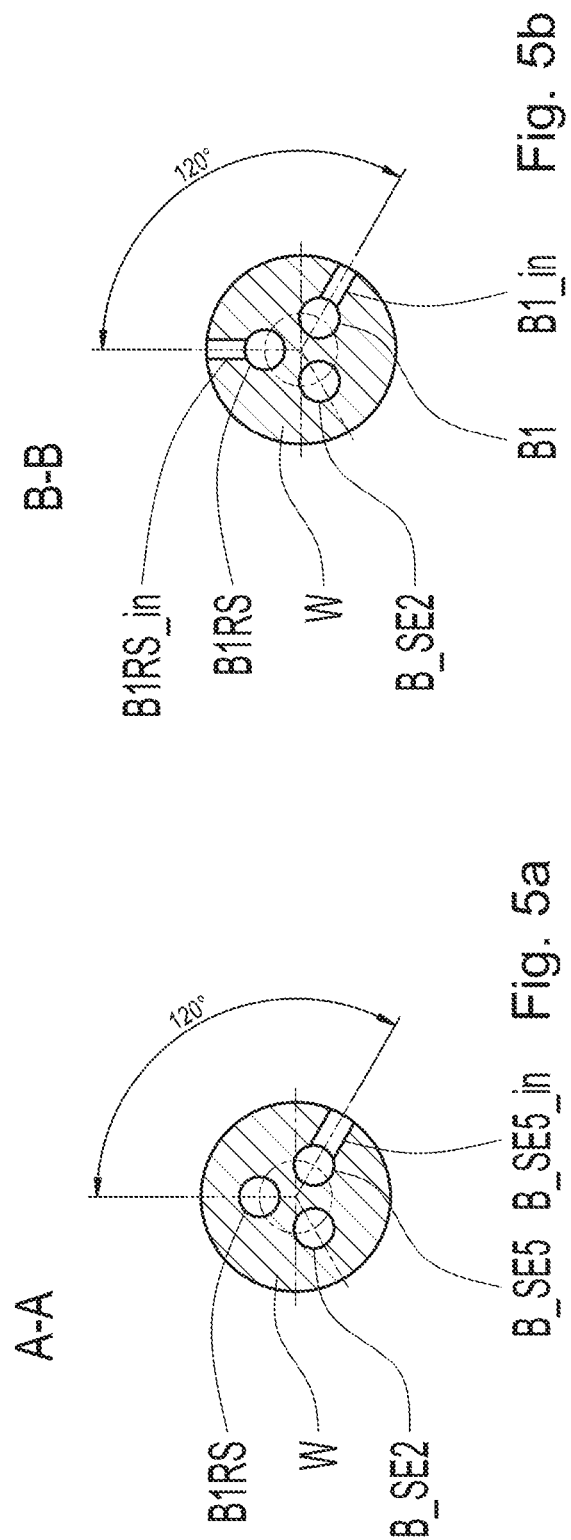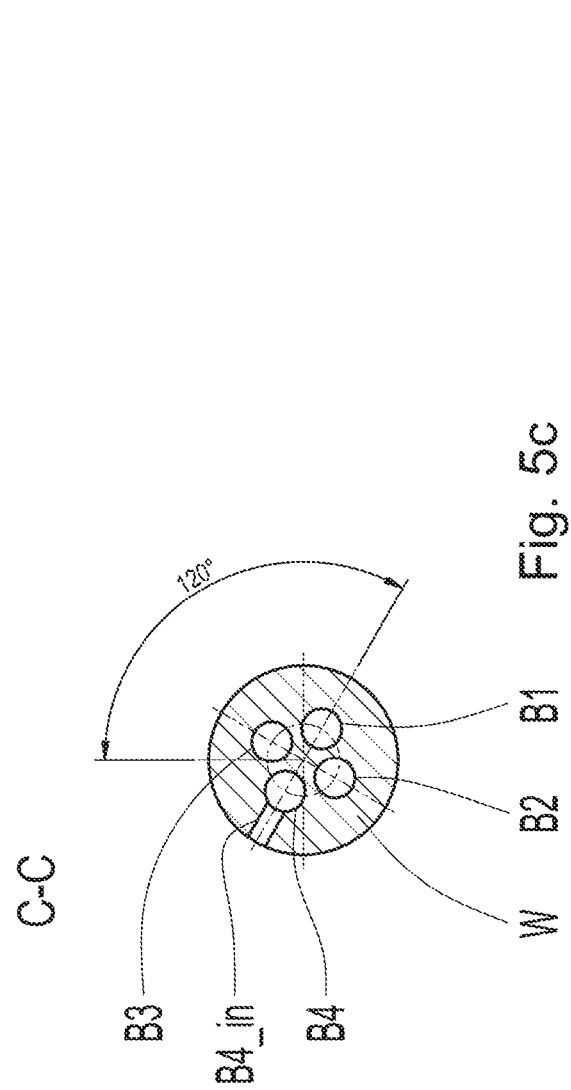

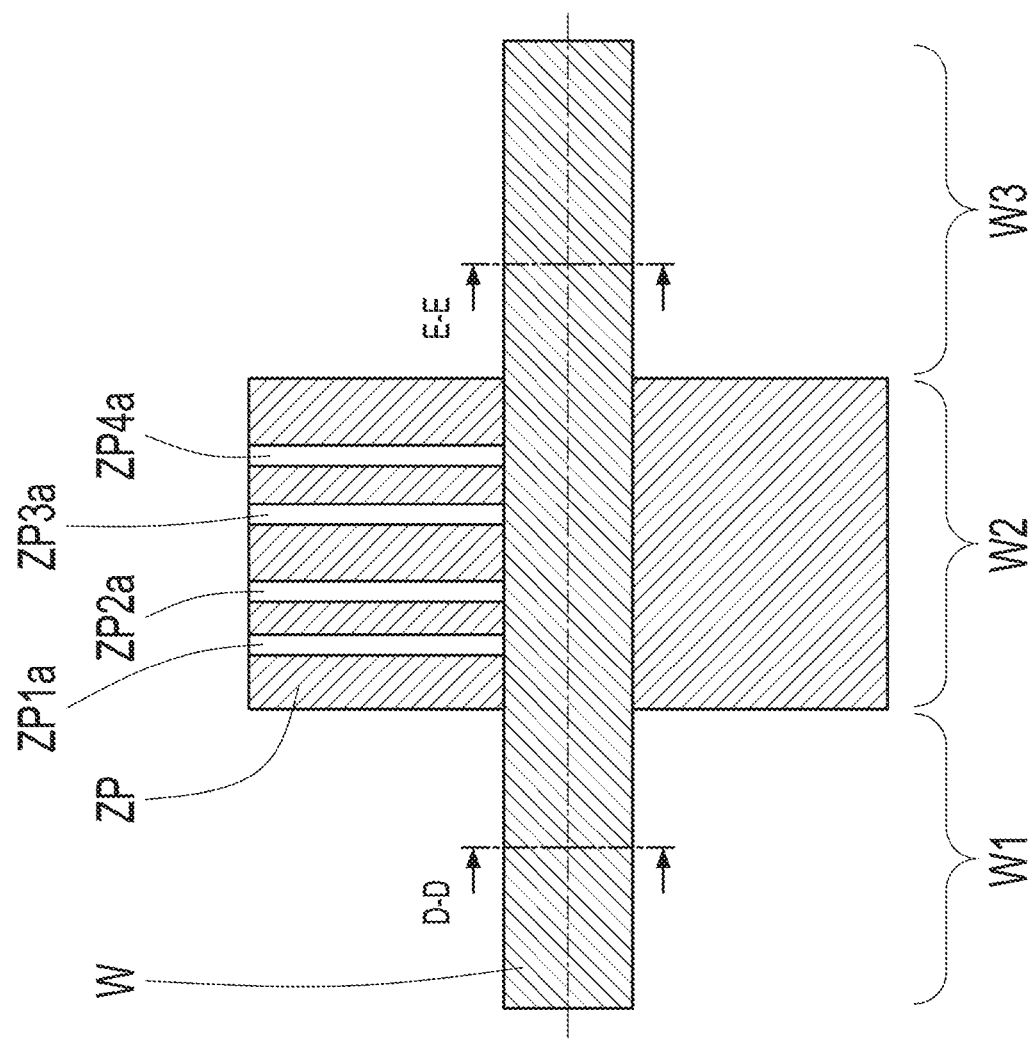

TRANSMISSION SHAFT, TRANSMISSION, AND MOTOR VEHICLE DRIVETRAIN

CROSS-REFERENCE TO RELATED APPLICATION

The present application is related and has right of priority to German Patent Application No. 10 2019 202 447.5 filed on Feb. 22, 2019, the entirety of which is incorporated by reference for all purposes.

FIELD OF THE INVENTION

The invention relates generally to a shaft for a motor vehicle transmission, a transmission for a motor vehicle having such a shaft, and a drivetrain for a motor vehicle having such a transmission.

BACKGROUND

From the prior art, it is known with respect to motor vehicle transmissions to feed or supply hydraulic fluid to elements of the transmission via bore holes extending in a transmission shaft. For example, DE 10 2013 219 631 A1 describes a system for supplying transmission elements with fluid. Therein, multiple axially extending bore holes are arranged in an input shaft of the transmission. A fluid supply to the bore holes takes place via five feed ducts, which are arranged axially directly adjacent to one another. Oil is delivered for an actuation of a torque converter-torque converter lockup clutch via one of the feed ducts and a bore hole arranged coaxially to the axis of rotation of the input shaft. One of the feed ducts is connected to a further bore hole, which is also arranged coaxially to the axis of rotation.

In such a design, it is essential that the shaft still has sufficient strength despite the bore holes. An outer diameter of the shaft is to be kept as small as possible, in order to keep the diameter of the shaft bearings and of sealing elements engaging the shaft small. In addition, it must be taken into account that various high pressures act in the bore holes. If the wall thickness between the bore holes is too small, breakthroughs form between the bore holes during operation, thereby resulting in hydraulic short circuits. The tolerances must be taken into account during the formation of the bore holes, since, particularly with relatively deep bore holes, an oblique position of the drilling axis considerably reduces the wall thickness between the bore holes.

The problem addressed by the invention is therefore that of providing a shaft, which is distinguished by a high level of security against hydraulic short circuits.

SUMMARY OF THE INVENTION

A shaft is provided for a motor vehicle transmission, which has multiple axial bore holes. An axial bore hole is understood to mean, in this case, that the axis of such an axial bore hole is aligned axially parallel or coaxially to the axis of rotation of the shaft. The bore holes are distributed within the shaft and are utilized for guiding fluid within the shaft.

The shaft has a first axial section, a second axial section, and a third axial section. The second axial section is arranged axially between the first axial section and the third axial section. In other words, the second axial section is located, spatially, between the first axial section and the third axial section. A fluid supply to the bore holes takes place in the second axial section. In this second axial section, the shaft has, for example, radial bore holes, through which fluid starting from the outer diameter of the shaft reaches the various axial bore holes. A fluid discharge from the bore holes takes place in the first axial section and the third axial section. For this purpose, the shaft has radial bore holes in the first axial section and in the third axial section, through which fluid from the axial bore holes reaches the outer diameter of the shaft. Alternatively, or additionally, fluid exits at the axial ends of the shafts.

According to the invention, a spatial arrangement of at least one of the axial bore holes, which is radially spaced apart from the axis of rotation of the shaft, is congruent or coaxial with a spatial arrangement of at least one of the other axial bore holes. One of these two coaxially arranged, axial bore holes is arranged, at least partially, in the first axial section, but not in the third axial section. The other of these two coaxially arranged bore holes is arranged, at least partially, in the third axial section, but not in the first axial section.

A "congruent spatial arrangement" of two bore holes is understood to mean that the position of these bore holes in the cross-section of the shaft is equal or the same. The two bore holes have diameters that are the same or are different from one another. The axes of two such bore holes are coaxial to each other.

Due to the embodiment of the shaft according to the invention, the risk of a hydraulic short circuit between the two axial bore holes is easily reduced.

According to one possible embodiment, the number of axial bore holes extending in the first axial section of the shaft differs from the number of bore holes extending in the third axial section. For example, four axial bore holes are arranged in the first axial section and three axial bore holes are arranged in the third axial section. As such, the approach according to the invention is particularly advantageous for shafts having a high number of axial bore holes, since the risk of a hydraulic short circuit is typically high for such shafts.

Preferably, the axial bore holes extending in the first axial section and in the third axial section are uniformly distributed in the cross-section of the shaft. Such a uniform arrangement of the axial bore holes facilitates a high mechanical strength of the shaft.

According to one possible alternative embodiment, precisely two of the axial bore holes, arranged in a spatially congruent manner, extend both in the first axial section and in the third axial section. According to one possible further alternative embodiment, precisely three of the axial bore holes, arranged in a spatially congruent manner, extend both in the first axial section and in the third axial section. Since the approach according to the invention is particularly advantageous for shafts having a high number of axial bore holes, the provided shaft is suited, in particular, for these alternative embodiments.

The shaft is preferably an integral part of a transmission for a motor vehicle. For example, the shaft forms an input shaft of the transmission.

The transmission having the shaft preferably has a hydrodynamic torque converter including a hydraulically actuatable torque converter lockup clutch as well as multiple hydraulically actuatable shift elements. A gear implementation of the transmission is controlled via selective actuation of the shift elements. A fluid supply to the torque converter and/or for the actuation of the torque converter lockup clutch takes place via one of the axial bore holes of the shaft, which is arranged in the first axial section of the shaft. If the torque converter is a so-called dual-line torque converter, the actuation of the torque converter lockup clutch takes place via the fluid supply to the torque converter. If the torque converter is a so-called three-line torque converter, then, preferably, a bore hole is provided for feeding or supplying fluid to the torque converter and a separate bore hole is provided for supplying fluid for the torque converter lockup clutch actuation. A fluid supply for actuating at least one of the shift elements preferably takes place via one of the axial bore holes arranged in the third axial section of the shaft. Such an approach offers the advantage that the fluid supply to the torque converter and/or for the torque converter lockup clutch actuation and for actuating at least one of the shift elements takes place centrally at the second axial section of the shaft. Therefore, for example, a separate fluid feed duct at a front bearing shield of the transmission is omitted.

Preferably, the transmission also has a hydraulically actuatable separating clutch, which is operable to connect an input hub of the transmission and the torque converter. A fluid supply for actuating the separating clutch preferably takes place via one of the axial bore holes of the shaft, which is arranged in the first axial section. This approach also offers the advantage that a separate fluid feed duct for the separating clutch actuation at a front bearing shield of the transmission is omitted.

According to one preferred embodiment, one of the axial bore holes, which is arranged in the first axial section of the shaft, is utilized for supplying lubricating oil to components of the transmission. A further one of the axial bore holes, which is arranged in the third axial section of the shaft, is also utilized for feeding or supplying lubricating oil to components of the transmission. The transmission components include, for example, gears, antifriction bearings, plain bearings, thrust washers, or vibration dampers.

The transmission according to one of the above-described embodiments is an integral part of a drivetrain for a motor vehicle.

BRIEF DESCRIPTION OF THE FIGURES

Exemplary embodiments of the invention are described in detail in the following with reference to the attached figures. Wherein:

FIG. 1b shows a partial, schematic representation of the transmission according to FIG. 1a;

FIG. 5a shows a cross-sectional view of a shaft of the transmission according to the second exemplary embodiment;

FIG. 5b shows another cross-sectional view of the shaft of the transmission according to the second exemplary embodiment;

FIG. 5c shows a further cross-sectional view of the shaft of the transmission according to the second exemplary embodiment;

FIG. 6 shows a schematic sectional view of a section of a transmission according to a third possible exemplary embodiment;

DETAILED DESCRIPTION

Figure 1A:
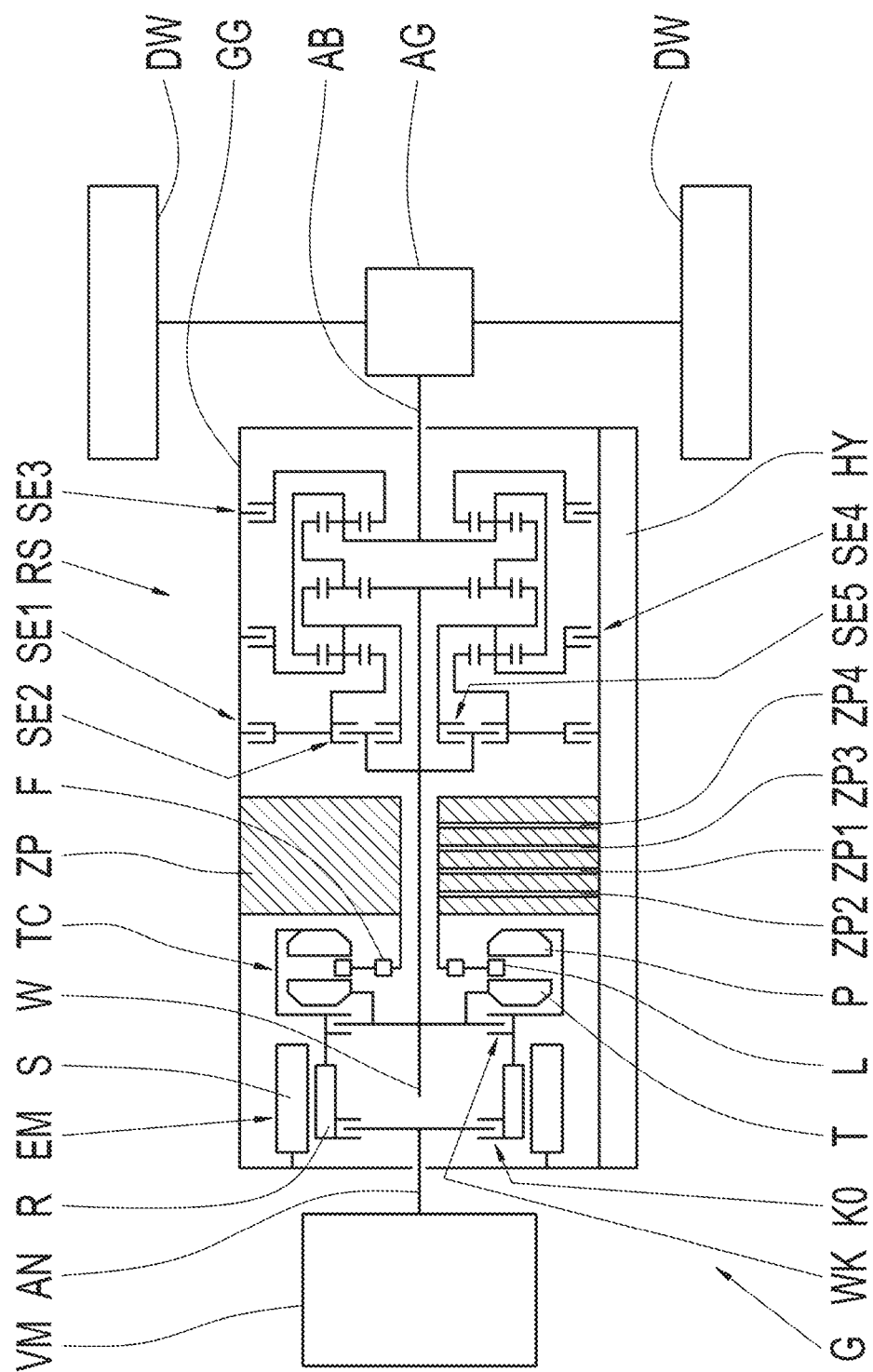
FIG. 1a shows a schematic view of a motor vehicle drivetrain having a transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1a schematically illustrates a drivetrain of a motor vehicle. The drivetrain has an internal combustion engine VM, a transmission G including a shaft W, and a differential gear AG. The internal combustion engine VM is connected to an input hub AN of the transmission G. A torsional vibration damper (not shown in FIG. 1a) is optionally arranged in this connection between the internal combustion engine VM and the input hub AN. An output shaft AB of the transmission G is connected to the differential gear AG, for example, via a cardan shaft. The power present at the output shaft AB is distributed to driving wheels DW of the motor vehicle with the aid of the differential gear AG. The drivetrain represented in FIG. 1a is to be considered merely as an example. For instance, instead of a drivetrain with a transmission G aligned longitudinally with respect to the direction of travel of the motor vehicle, a transmission in a drivetrain aligned transversely to the direction of travel is also usable. The differential gear AG is optionally integrated into a housing GG of the transmission G.

The transmission G has a hydrodynamic torque converter TC including an impeller P, a turbine wheel T, a stator L, and a torque converter lockup clutch WK. The impeller P is connected to the turbine wheel T by engaging the torque converter lockup clutch WK.

The stator L is supported via a freewheel unit F on a housing plate ZP attached to the housing GG. The turbine wheel T is connected to the shaft W. The transmission G further includes an electric machine EM including a rotationally fixed stator S and a rotary rotor R. The rotor R is connected to the impeller P and is connectable to the input shaft AN via a separating clutch K0.

The transmission G includes a hydraulic unit HY. The hydraulic unit HY has a pump (not shown) and a hydraulic control unit (not shown). The pump delivers hydraulic fluid to the hydraulic control unit. The hydraulic control unit is configured for distributing the hydraulic fluid to various hydraulic consumers of the transmission G according to demand. The housing plate ZP has a first oil duct ZP1, a second oil duct ZP2, a third oil duct ZP3, and a fourth oil duct ZP4. The oil ducts ZP1, ZP2, ZP3, ZP4 are utilized for guiding the oil from the hydraulic control unit to the shaft W.

The arrangement of the oil ducts ZP1, ZP2, ZP3, ZP4 represented in FIG. 1a, axially one behind the other, is to be considered merely as an example, and is used mainly for the purpose of better illustration. All or a few of the oil ducts ZP1, ZP2, ZP3, ZP4 are arranged in a same cross-sectional plane of the housing plate ZP, which allows the transmission G to be axially compact.

Using the transmission G, various gear steps are made available between the shaft W and the output shaft AB. For this purpose, the transmission G includes multiple planetary gear sets, which, together, are designated as a gear set RS. The shaft W acts as an input shaft of the gear set RS. The transmission G also has a plurality of shift elements, including a first shift element SE1, a second shift element SE2, a third shift element SE3, a fourth, shift element SE4, and a fifth shift element SE5. The plurality of shift elements SE1, SE2, SE3, SE4, SE5 cooperate with the planetary gear sets of the gear set RS to implement gears of the transmission G. The transmission G according to the representation in FIG. 1a is to be considered merely as an example. Instead of the planetary gear sets, for example, spur gear trains are utilizable for implementing gears.

Figure 1B:
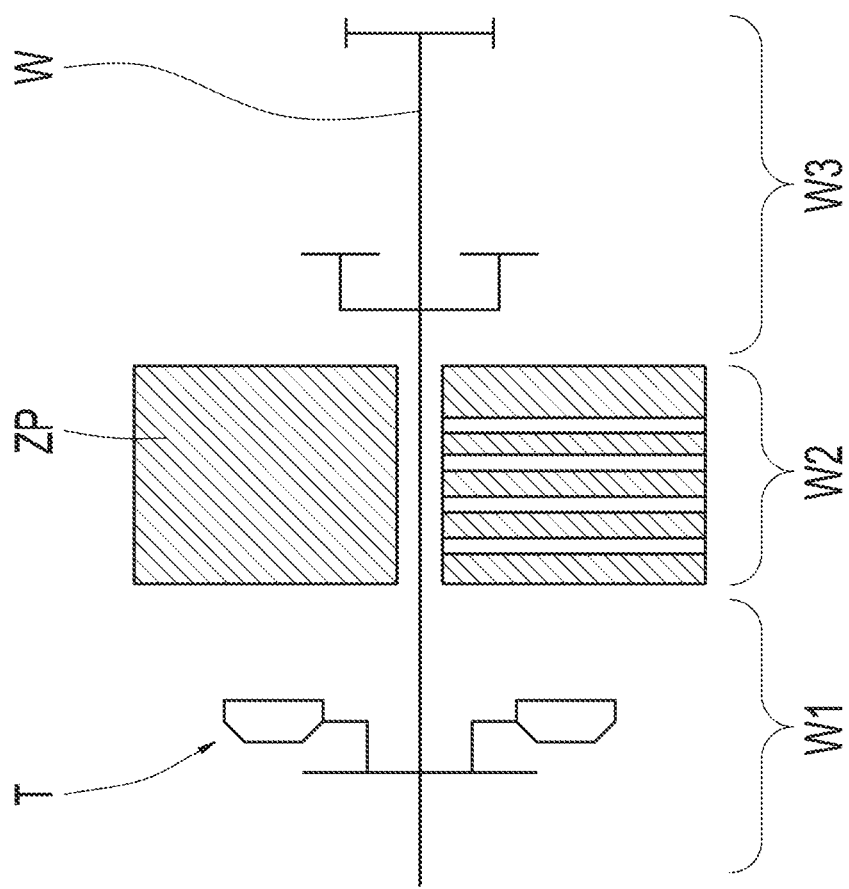

FIG. 1b shows a partial schematic representation of the transmission G represented in FIG. 1a. In this case, only the shaft W including the turbine wheel T connected thereto, as well as the housing plate ZP are represented. As shown in FIG. 1b, the shaft W has three axial sections, namely a first axial section W1, a second axial section W2, and a third axial section W3. The second axial section W2 is axially arranged between the first axial section W1 and the third axial section W3. In the second axial section W2, fluid is supplied to axial bore holes (not shown in FIG. 1b) arranged in the shaft W via the oil ducts ZP1, ZP2, ZP3, ZP4 arranged in the housing plate ZP. Fluid is discharged from the bore holes in the first axial section W1 and third axial section W3. The third axial section W3 is associated with the gear set RS. The first axial section W1 is associated with the torque converter TC, the separating clutch K0, and the torque converter lockup clutch WK.

Figure 2:
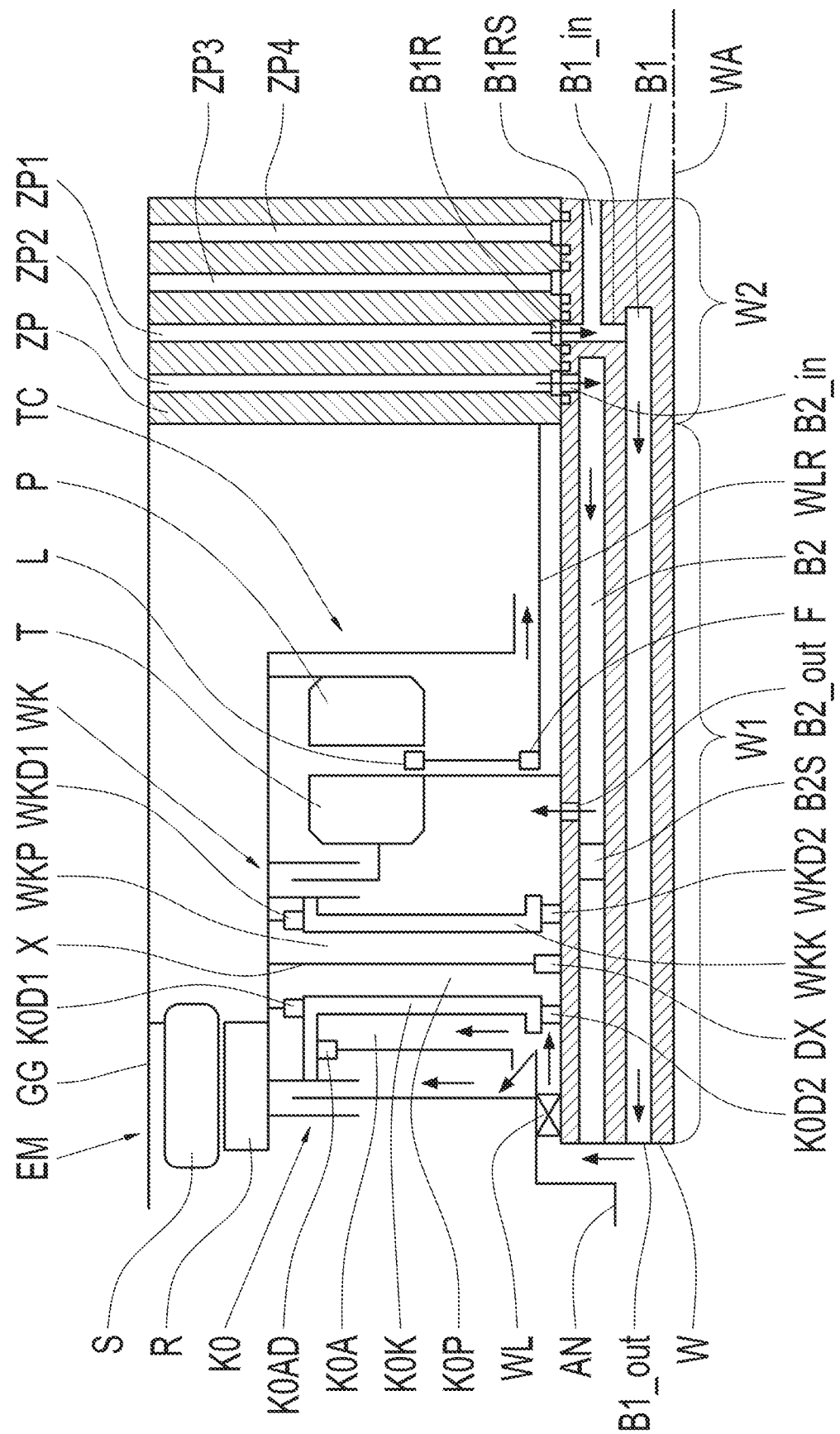
FIG. 2 shows a schematic sectional view of a transmission according to a first possible exemplary embodiment.

FIG. 2 shows a schematic, sectional view of a section of the transmission G according to a first exemplary embodiment. The torque converter lockup clutch WK is a wet-running clutch and is actuated with a first piston WKK, where the first piston WKK is connected to a first pressure chamber WKP. The first piston WKK is guided between two seals, first seal WKD1 and second seal WKD2. The first pressure chamber WKP is delimited, in sections, by a radial wall X, which is connected to the impeller P. A gap between the wall X and the shaft W is sealed off by a seal DX.

The separating clutch K0 is actuated via a second piston K0K, with the second piston K0K being connected to a second pressure chamber K0P. The second piston K0K is guided between two seals, third seal K0D1 and fourth seal K0D2. The second pressure chamber K0P is delimited, at least partially, by the radial wall X. A pressure compensating cavity K0A is provided for compensating for the rotary forces acting in the second pressure chamber K0P. The second piston K0K is arranged between the second pressure chamber K0P and the pressure compensating cavity K0A. The shaft W is supported at the input hub AN via an antifriction bearing WL so that the shaft W is rotatably mounted for rotation about the axis of rotation WA. Further antifriction bearings (not shown in FIG. 2) are optionally provided for mounting the shaft W and the input hub AN.

In FIG. 2, the oil feed to the toroidal space of the torque converter TC, the oil feed to the antifriction bearing WL, and the lubricating oil feed to a portion of the gear set RS are represented. The section plane of the shaft W is selected such that a first axial bore hole B1 and a second axial bore hole B2 are visible in FIG. 2. The second axial bore hole B2 is utilized for feeding oil to the toroidal space of the torque converter TC. Oil is fed to the second axial bore hole B2 through a second inlet bore hole B2_in in the shaft W, wherein the oil exits the shaft W through a second outlet bore hole B2_out. Oil is fed into the second inlet bore hole B2_in via the second oil duct ZP2. The hydraulic interface between the second oil duct ZP2 and the second inlet bore hole B2_in is sealed off with the aid of two sealing rings. The oil feed to the first and second axial bore holes B1, B2 takes place in the second axial section W2 of the shaft W. The fed oil emerges from the first and second axial bore holes B1, B2 in the first axial section W1 of the shaft W.

Oil is supplied, via the second outlet bore hole B2_out, to the torque converter lockup clutch WK and to the hydrodynamic path between the impeller P, the turbine wheel T, and the stator L. Oil is discharged from the toroidal space of the torque converter TC, for example, through a gap, which is arranged between a housing of the torque converter TC connected to the impeller P and a shaft WLR connected to the stator L. The corresponding oil path is indicated in FIG. 2 with the aid of arrows. Downstream from the second outlet bore hole B2_out, the second axial bore hole B2 is closed by a second cap B2S.

The first axial bore hole B1 is utilized for feeding oil to the antifriction bearing WL, for filling the pressure compensating cavity K0A, and for feeding oil to the separating clutch K0. Via the first oil duct ZP1, oil is fed to an annular gap B1R. Oil from the annular gap B1R is fed to the first bore hole B1 via a first inlet bore hole B1_in in the shaft W. A portion of this oil emerges from a first outlet opening B1_out in the face end of the shaft W. Due to the rotation of the shaft W, this oil is slung radially outward toward an inner side of the input hub AN. From there, the oil flows through the antifriction bearing WL towards the fourth seal K0D2. The oil enters the pressure compensating cavity K0A through an axial gap between an axial end of the input hub AN and the second piston K0K. If the pressure compensating cavity K0A is sufficiently filled with oil, the oil is fed to the separating clutch K0.

A further axial bore hole B1RS is arranged coaxially with the second axial bore hole B2. The further axial bore hole B1RS opens into the first inlet bore hole B1_in, so that the oil, which is guided from the annular gap B1R into the first inlet bore hole B1_in, is distributed into the first bore hole B1 and into the further axial bore hole B1RS. Via the further axial bore hole B1RS, oil is fed to elements of the gear set RS, for example, for lubrication. The oil feed to the further axial bore hole B1RS takes place in the second axial section W2 of the shaft W, and the oil discharge from the further axial bore hole B1RS takes place in the third axial section W3 of the shaft W (not shown).

Figure 3:
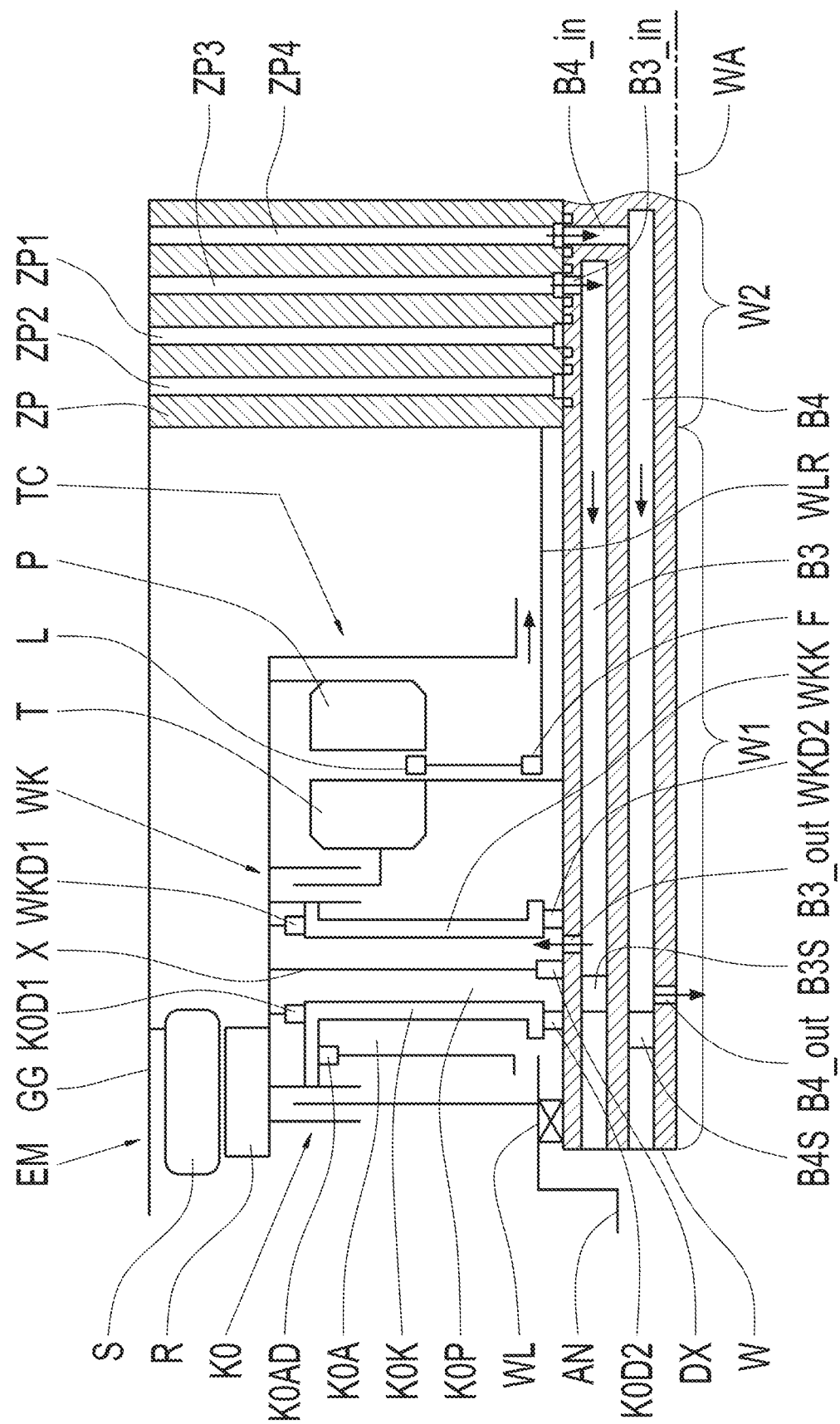
FIG. 3 shows another schematic sectional view of a transmission according to the first possible exemplary embodiment.

FIG. 3 shows a further schematic sectional view of a section of the transmission G according to the first exemplary embodiment represented in FIG. 2. The cutting plane through the shaft W was selected such that a third axial bore hole B3 and a fourth axial bore hole B4 are visible. The third axial bore hole B3 is utilized for feeding oil to the first pressure chamber WKP of the torque converter lockup clutch WK. The fourth axial bore hole B4 is utilized for feeding oil to the second pressure chamber K0P of the separating clutch K0.

Oil is fed to the third axial bore hole B3 via the third oil duct ZP3 in the housing plate ZP. Via the third oil duct ZP3, oil enters a third inlet bore hole B3_in in the shaft W, which is connected to the third axial bore hole B3. The oil fed through the third inlet bore hole B3_in enters the first pressure chamber WKP through a third outlet bore hole B3_out and, in fact, between the seal DX and the second seal WKD2. Downstream from the third outlet bore hole B3_out, the third axial bore hole B3 is closed by a third cap B3S. The hydraulic interface between the third oil duct ZP3 and the third inlet bore hole B3_in is sealed off by two sealing rings.

Oil is fed to the fourth axial bore hole B4 via the fourth oil duct ZP4 in the housing plate ZP. Via the fourth oil duct ZP4, oil enters a fourth inlet bore hole B4_in in the shaft W, which is connected to the fourth axial bore hole B4. The oil fed through the fourth inlet bore hole B4_in enters the second pressure chamber K0P through a fourth outlet bore hole B4_out and, in fact, between the seal DX and the fourth seal K0D2. Downstream from the fourth outlet bore hole B4_out, the fourth axial bore hole B4 is closed by a fourth cap B4S. The hydraulic interface between the fourth oil duct ZP4 and the fourth inlet bore hole B4_in is sealed off by two sealing rings.

The oil feed to the third and fourth bore holes B3, B4 takes place in the second axial section W2 of the shaft W. The oil exits from the third and fourth bore holes B3, B4 in the first axial section W1 of the shaft W.

Figure 4:
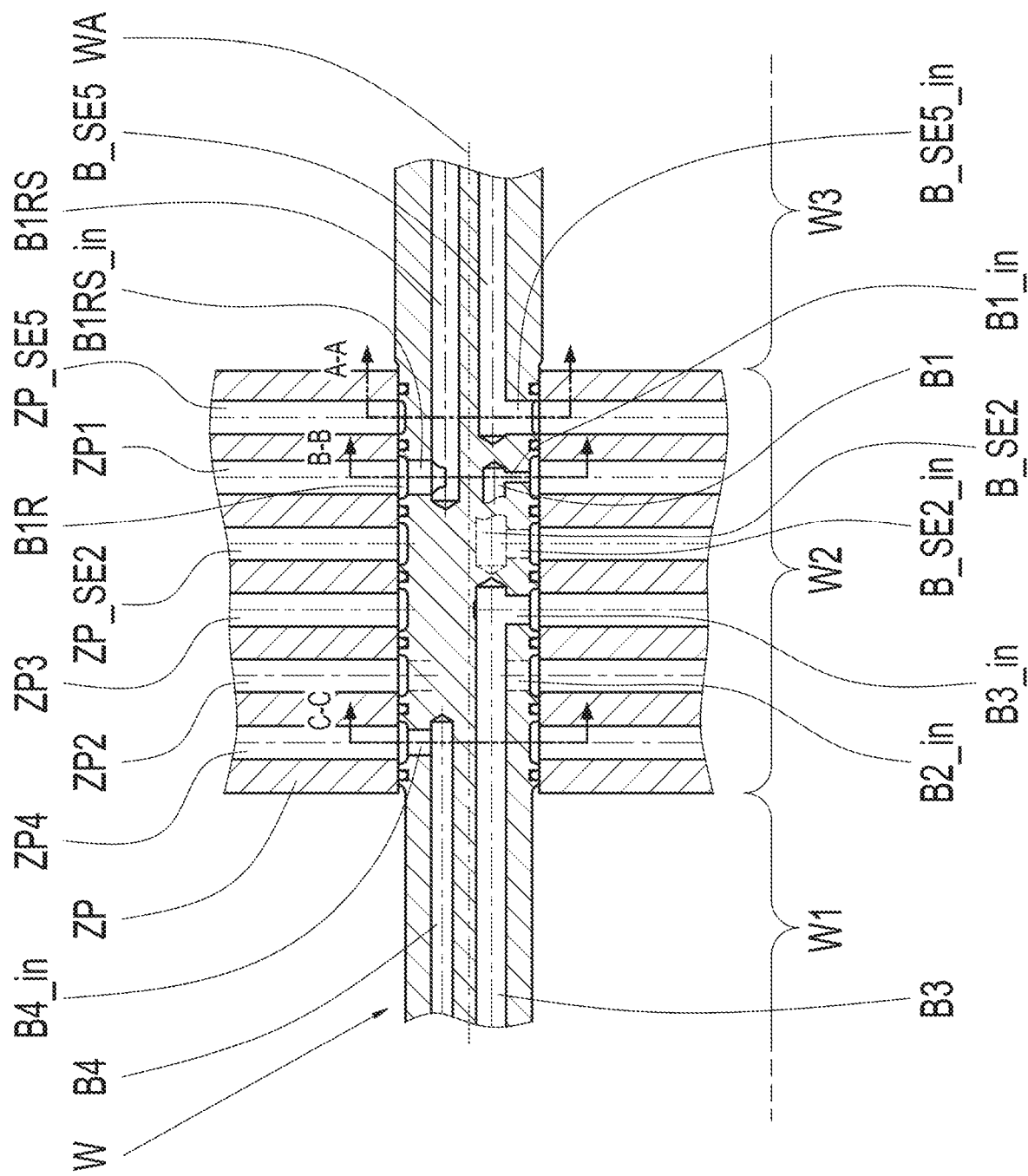
FIG. 4 shows a schematic sectional view of a section of a transmission according to a second possible exemplary embodiment.

FIG. 4 shows a schematic sectional view of a section of the transmission G according to a second exemplary embodiment, in which the housing plate ZP and the shaft W differ from the first exemplary embodiment according to FIGS. 2 and 3. In particular, the housing plate ZP in FIG. 4 includes, in addition to the first, second, third, and fourth oil ducts ZP1, ZP2, ZP3, ZP4, two additional oil ducts, a fifth oil duct ZP_SE2 and a sixth oil duct ZP_SE5, in order to feed oil to a total of seven axial bore holes, including the first, second, third, and fourth axial bore holes B1, B2, B3, B4, the further axial bore hole B1RS, and, additionally, a fifth axial bore hole B_SE2 and a sixth axial bore hole B_SE5 of the shaft W.

Via the fourth oil duct ZP4, oil enters the fourth axial bore hole B4. The oil fed into the fourth axial bore hole B4 is utilized for actuating the separating clutch K0. The oil from the fourth axial bore hole B4 enters the second pressure chamber K0P via a radial bore hole (not shown in FIG. 4) arranged in the first axial section W1 of the shaft W.

The second axial bore hole B2 is not visible in the sectioning of the shaft W according to FIG. 4; only the radial second inlet bore hole B2_in is indicated. The oil fed into the second axial bore hole B2 is utilized for feeding oil to the torque converter TC. Via a radial bore hole (not shown in FIG. 4) arranged in the first axial section W1 of the shaft W, the oil from the second axial bore hole B2 reaches the torque converter lockup clutch WK and the hydrodynamic path between the impeller P, the turbine wheel T, and the stator L.

The oil fed into the third axial bore hole B3 is utilized for actuating the torque converter lockup clutch WK. The oil from the third axial bore hole B3 enters the first pressure chamber WKP via a radial bore hole (not shown in FIG. 4) arranged in the first axial section W1 of the shaft W.

The oil fed via a fifth inlet bore hole B_SE2_in into the fifth axial bore hole B_SE2 is utilized for actuating the second shift element SE2, which is a clutch between two shafts of the gear set RS. The oil from the fifth axial bore hole B_SE2 enters a pressure chamber for actuating the second shift element SE2 via a radial bore hole (not shown in FIG. 4) arranged in the third axial section W3 of the shaft W.

The oil fed into the annular gap B1R is utilized for feeding oil to the antifriction bearing WL, for filling the pressure compensating cavity K0A, for feeding oil to the separating clutch K0, and for feeding oil to lubrication points of the gear set RS. The gap B1R is connected to the first axial bore hole B1 via the radial first inlet bore hole B1_in. The oil fed into the first axial bore hole B1 is utilized for feeding oil to the antifriction bearing WL, for filling the pressure compensating cavity K0A, and for feeding oil to the separating clutch K0. The oil fed into the first axial bore hole B1 exits at an axial end of the shaft W in the first axial section W1 (not shown in FIG. 4). Furthermore, the gap B1R is connected to the further axial bore hole B1RS via a radial bore hole, a further inlet B1RS_in. The oil fed into the further axial bore hole B1RS exits from one or multiple radial bore holes, which are arranged in the third axial section W3 of the shaft W (not shown in FIG. 4). The further and first inlet bore holes B1RS_in, B1_in have different diameters. As a result, the oil distribution between the first axial bore hole B1 and further axial bore hole B1RS is easily influenced.

The oil fed via a sixth inlet bore hole B_SE5_in into the sixth axial bore hole B_SE5 is utilized for actuating the fifth shift element SE5, which is a clutch between two shafts of the gear set RS. The oil from the sixth axial bore hole B_SE5 enters a pressure chamber for actuating the fifth shift element SE5 via a radial bore hole (not shown in FIG. 4) arranged in the third axial section W3 of the shaft W.

In the second exemplary embodiment represented in FIG. 4, the first and sixth axial bore holes B1, B_SE5 are coaxial. This is described in the following on the basis of the section cuts of the shaft W in FIGS. 5a-5c.

FIG. 5a shows the cross-section of the shaft W corresponding to the cutting plane A-A indicated in FIG. 4. The further axial bore hole B1RS, fifth axial bore hole B_SE2, and sixth axial bore hole B_SE5 are visible in the cutting plane A-A. The angular position of the sixth axial bore hole B_SE5 is emphasized. The further axial bore hole B1RS, the fifth axial bore hole B_SE2, and the sixth axial bore hole B_SE5 extend from the second axial section W2 as shown in FIG. 4 to the third axial section W3 of the shaft W. The further axial bore hole B1RS, the fifth axial bore hole B_SE2, and the sixth axial bore hole B_SE5 are uniformly distributed in the cross-section of the shaft W shown in FIG. 5a.

FIG. 5b shows the cross-section of the shaft W corresponding to the cutting plane B-B indicated in FIG. 4. The further axial bore hole B1RS, the fifth axial bore hole B_SE2, and the first axial bore hole B1 are visible in the cutting plane B-B. The angular position of the first axial bore hole B1 is emphasized. When compared to FIG. 5a, the first and sixth axial bore holes B1 and B_SE5 are coaxially arranged.

FIG. 5c shows the cross-section of the shaft W corresponding to the cutting plane C-C indicated in FIG. 4. The first, second, third, and fourth axial bore holes B1, B2, B3, B4 are visible in the cutting plane C-C. The first, second, third, and fourth axial bore holes B1, B2, B3, B4 extend from the second axial section W2 as shown in FIG. 4 to the first axial section W1 of the shaft W. The first, second, third, and fourth axial bore holes B1, B2, B3, B4 are uniformly distributed in the cross-section of the shaft W shown in FIG. 5c.

FIG. 6 shows a schematic sectional view of a section of the transmission G according to a third exemplary embodiment, in which the housing plate ZP and the shaft W differ from the first two exemplary embodiments. In particular, the housing plate includes four oil ducts, including a first oil duct ZP1a, a second oil duct ZP2a, a third oil duct ZP3a, and a fourth oil duct ZP4a, in order to feed oil to a total of four axial bore holes, including a first axial bore hole B1a, a second axial bore hole B2a, a third axial bore hole B3a, and a fourth axial bore hole B4a (not shown in FIG. 6) of the shaft W. The feed of the oil from each of the four oil duct ZP1a, ZP2a, ZP3a, ZP4a into a respective one of the four axial bore holes B1a, B2a, B3a, B4a takes place through sealed annular gaps in the same way as represented in FIG. 4.

The first oil duct ZP1a feeds oil to the first axial bore hole B1a. The second oil duct ZP2a feeds oil to the second axial bore hole B2a. The third oil duct ZP3a feeds oil to the third axial bore hole B3a. The fourth oil duct ZP4a feeds oil to the fourth axial bore hole B4a. The feed of the oil starting from each of the four oil ducts ZP1a, ZP2a, ZP3a, ZP4a into a respective one of the four axial bore holes B1a, B2a, B3a, B4a takes place in the second axial section W2 of the shaft W. The first and second bore holes B1a and B2a extend from the second axial section W2 to the first axial section W1, but not to the third axial section W3. The third and fourth bore holes B3a and B4a extend from the second axial section W2 to the third axial section W3, but not to the first axial section W1. The oil discharge from the first and second bore holes B1a and B2a takes place in the first axial section W1 of the shaft W. The oil discharge from the bore third and fourth bore holes B3a and B4a takes place in the third axial section W3 of the shaft W.

Figure 7B:
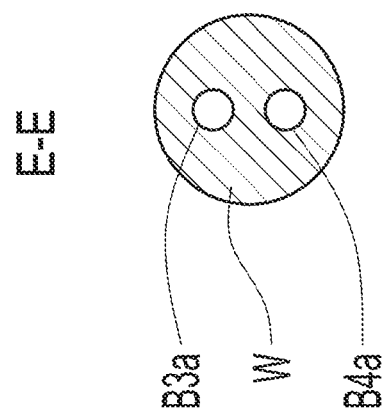
FIG. 7b shows another cross-sectional view of the shaft of the transmission according to the third exemplary embodiment.
Figure 7A:
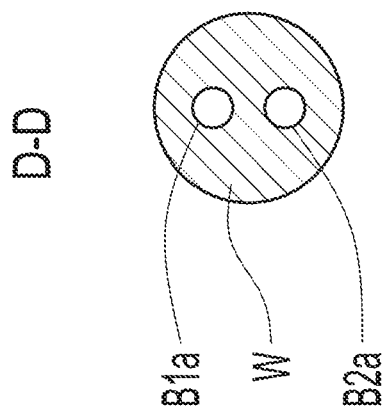
FIG. 7a shows a cross-sectional view of a shaft of the transmission according to the third exemplary embodiment.

FIG. 7a shows the cross-section of the shaft W corresponding to the cutting plane D-D indicated in FIG. 6 and FIG. 7b shows the cross-section of the shaft W corresponding to the cutting plane E-E indicated in FIG. 6. In the third exemplary embodiment, the first and third axial bore holes B1a and B3a shown in FIGS. 7a and 7b, respectively, are congruently arranged or coaxial with each other. Moreover, the second and fourth axial bore holes B2a and B4a shown in FIGS. 7a and 7b, respectively, are congruently arranged or coaxial with each other.

Figure 8:
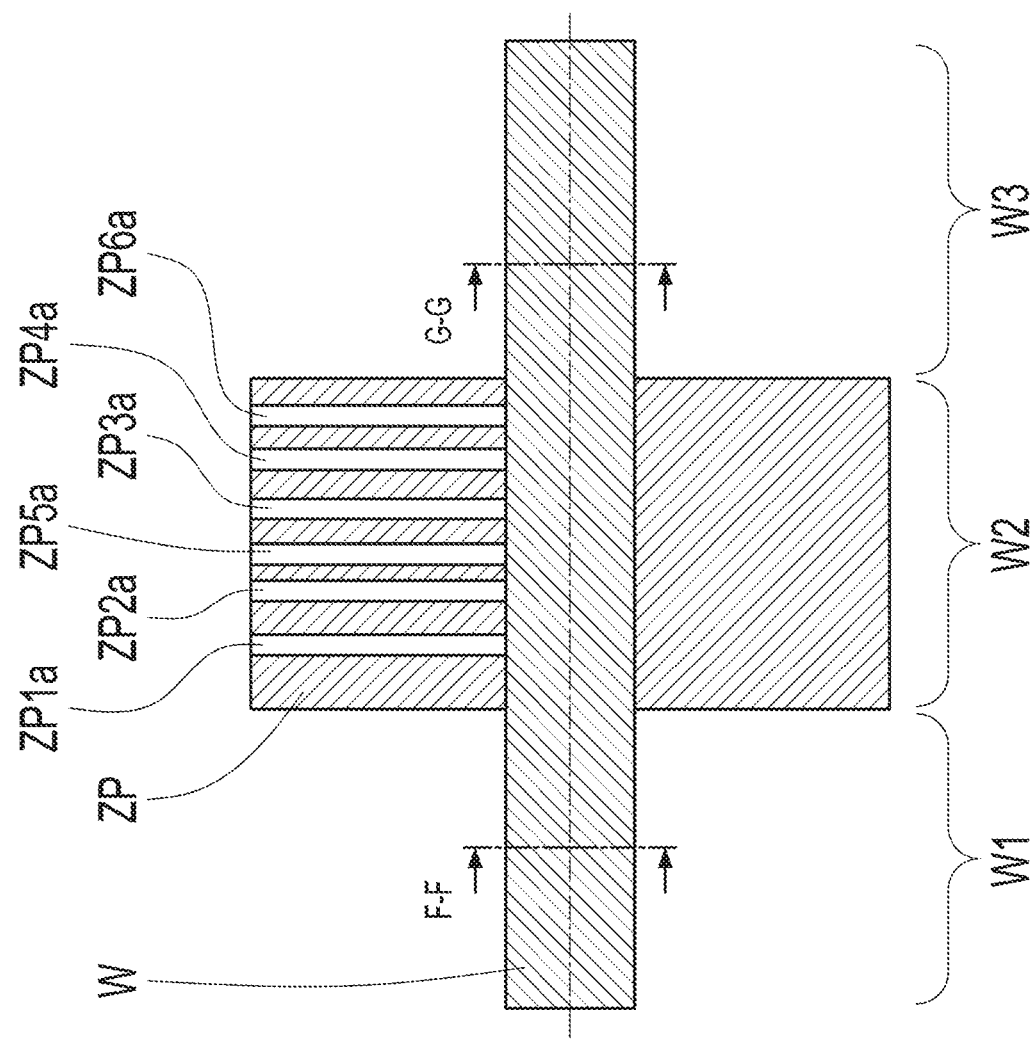
FIG. 8 shows a schematic sectional view of a section of a transmission according to a fourth possible exemplary embodiment.

FIG. 8 shows a schematic sectional view of a section of the transmission G according to a fourth exemplary embodiment, in which the housing plate ZP and the shaft W differ from the first three exemplary embodiments. The housing plate ZP includes six oil ducts, including a first oil duct ZP1a, a second oil duct ZP2a, a third oil duct ZP3a, a fourth oil duct ZP4a, a fifth oil duct ZP5a, and a sixth oil duct ZP6a, in order to feed oil to a total of six axial bore holes, including a first axial bore hole B1a, a second axial bore hole B2a, a third axial bore hole B3a, a fourth axial bore hole B4a, a fifth axial bore hole B5a, and a sixth axial bore hole B6a (not shown in FIG. 8) of the shaft W. The feed of the oil from each of the six oil ducts ZP1a, ZP2a, ZP3a, ZP4a, ZP5a, ZP6a into a respective one of the six axial bore holes B1a, B2a, B3a, B4a, B5a, B6a takes place through sealed annular gaps and in the same way as represented in FIG. 4.

The first oil duct ZP1a feeds oil to the first bore hole B1a. The second oil duct ZP2a feeds oil to the second bore hole B2a. The third oil duct ZP3a feeds oil to the third bore hole B3a. The fourth oil duct ZP4a feeds oil to the fourth bore hole B4a. The fifth oil duct ZP5a feeds oil to the fifth bore hole B5a. The sixth oil duct ZP6a feeds oil to the sixth bore hole B6a. The feed of the oil starting from each of the six oil ducts ZP1a, ZP2a, ZP3a, ZP4a, ZP5a, ZP6a into a respective one of the six axial bore holes B1a, B2a, B3a, B4a, B5a, B6a takes place in the second axial section W2 of the shaft W. The first, second, and fifth bore holes B1a, B2a, B5a extend from the second axial section W2 to the first axial section W1, but not to the third axial section W3. The third, fourth, and sixth bore holes B3a, B4a, B6a extend from the second axial section W2 to the third axial section W3, but not to the first axial section W1. The oil discharge from the first, second, and fifth bore holes B1a, B2a, B5a takes place in the first axial section W1 of the shaft W. The oil discharge from the third, fourth, and sixth bore holes B3a, B4a, B6a takes place in the third axial section W3 of the shaft W.

Figure 9B:
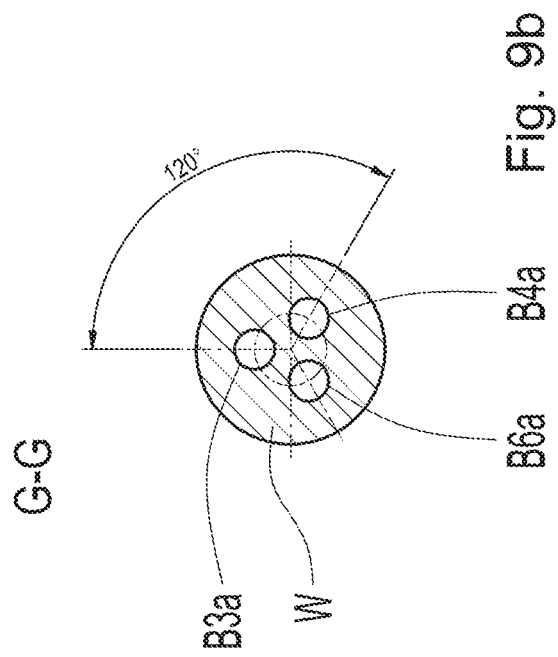
FIG. 9b shows another cross-sectional view of the shaft of the transmission according to the fourth exemplary embodiment.
Figure 9A:
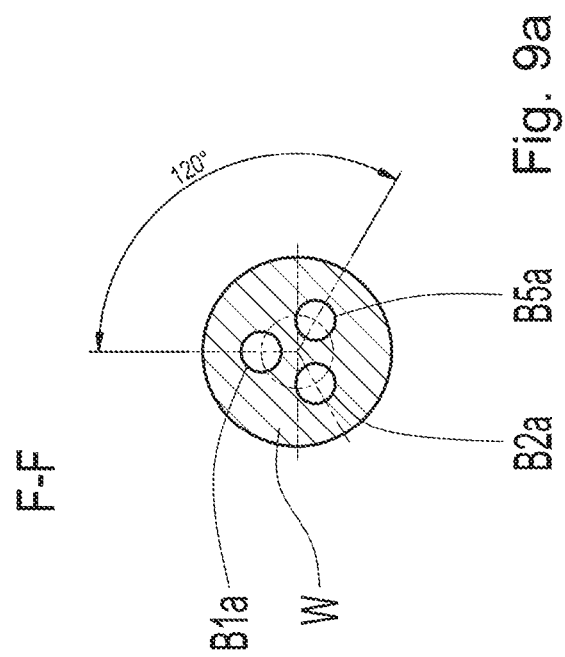
FIG. 9a shows a cross-sectional view of a shaft of the transmission according to the fourth exemplary embodiment.

FIG. 9a shows the cross-section of the shaft W corresponding to the cutting plane F-F indicated in FIG. 8 and FIG. 9b shows the cross-section of the shaft W corresponding to the cutting plane G-G indicated in FIG. 8. In the fourth exemplary embodiment, the first and third axial bore holes B1a, B3a shown in FIGS. 9a and 9b, respectively, are congruently arranged or coaxial with each other. Moreover, the second and sixth axial bore holes B2a and B6a shown in FIGS. 9a and 9b, respectively, are congruently arranged or coaxial with each other. Moreover, the fifth and fourth axial bore holes B5a and B4a shown in FIGS. 9a and 9b, respectively, are congruently arranged or coaxial with each other.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

VM internal combustion engine
G transmission
AN input hub
AB output shaft
GG housing
ZP housing plate
ZP1 first oil duct
ZP2 second oil duct
ZP3 third oil duct
ZP4 fourth oil duct
ZP_SE2 fifth oil duct
ZP_SE5 sixth oil duct
ZP1a first oil duct
ZP2a second oil duct
ZP3a third oil duct
ZP4a fourth oil duct
ZP5a fifth oil duct
ZP6a sixth oil duct
W shaft
WA axis of rotation
W1 first axial section of the shaft
W2 second axial section of the shaft
W3 third axial section of the shaft
B1R annular gap
B1 first axial bore hole
B1RS further axial bore hole
B2 second axial bore hole
B3 third axial bore hole
B4 fourth axial bore hole
B_SE2 fifth axial bore hole B_SE5 sixth axial bore hole
B1a first axial bore hole
B2a second axial bore hole
B3a third axial bore hole
B4a fourth axial bore hole
B5a fifth axial bore hole
B6a sixth axial bore hole
B1_in first inlet bore hole
B1RS_in further inlet bore hole
B1_out first outlet opening
B2_in second inlet bore hole
B2_out second outlet bore hole
B3_in third inlet bore hole
B3_out third outlet bore hole
B4_in fourth inlet bore hole
B4_out fourth outlet bore hole
B_SE2_in fifth inlet bore hole
B_SE5_in sixth inlet bore hole
B2S second cap
B3S third cap
B4S fourth cap
TC torque converter
P impeller
T turbine wheel
L stator
WLR stator shaft
F freewheel unit
WK torque converter lockup clutch
WKP first pressure chamber
WKK first piston
WKD1 first seal
WKD2 second seal
X wall
DX seal
K0 separating clutch
K0D1 third seal
K0D2 fourth seal
K0P second pressure chamber
K0K second piston
K0A pressure compensating cavity
EM electric machine
S rotor
R stator
WL antifriction bearing
HY hydraulic unit
RS gear set
SE1 first shift element
SE2 second shift element
SE3 third shift element
SE4 fourth shift element
SE5 fifth shift element
AG differential gear
DW driving wheel

The invention claimed is:
1. A shaft (W) for a motor vehicle transmission (G), comprising:
a plurality of axial bore holes (B1, B2, B3, B4, B1RS, B_SE2, B_SE5, B1a, B2a, B3a, B4a, B5a, B6a) positioned within the shaft (W) and configured to guide fluid within the shaft (W); and
a first axial section (W1), a second axial section (W2), and a third axial section (W3), the second axial section (W2) being axially between the first axial section (W1) and the third axial section (W3),
wherein fluid is supplied to the plurality of axial bore holes (B1, B2, B3, B4, B1RS, B_SE2, B_SE5, B1a, B2a, B3a, B4a, B5a, B6a) in the second axial section (W2),
wherein the fluid exits from the plurality of axial bore holes (B1, B2, B3, B4, B1RS, B_SE2, B_SE5, B1a, B2a, B3a, B4a, B5a, B6a) at the first axial section (W1) and at the third axial section (W3),
wherein one of the plurality of axial bore holes (B2; B1, B1a) is arranged, at least partially, in the first axial section (W1) and is radially spaced from an axis of rotation (WA) of the shaft (W),
wherein another of the plurality of axial bore holes (B1RS; B_SE5, B3a) is arranged, at least partially, in the third axial section (W3),
wherein the one of the plurality of axial bore holes (B2; B1, B1a) is coaxial with the other of the plurality of axial bore holes (B1RS; B_SE5, B3a), and
wherein a number of bore holes (B1, B2, B3, B4) of the plurality of axial bore holes arranged in the first axial section (W1) differs from a number of bore holes (B1RS, B_SE2, B_SE5) of the plurality of axial bore holes arranged in the third axial section (W3), the number of bore holes (B1, B2, B3, B4) of the plurality of axial bore holes arranged in the first axial section (W1) being four bore holes (B1, B2, B3, B4) and the number of bore holes (B1RS, B_SE2, B_SE5) of the plurality of axial bore holes arranged in the third axial section (W3) being three bore holes (B1RS, B_SE2, B_SE5).
2. The shaft (W) of claim 1, wherein bore holes (B1, B2, B3, B4) of the plurality of axial bore holes positioned within the first axial section (W1) are uniformly distributed in a cross-section of the first axial section (W1) of the shaft (W), and
wherein bore holes (B1RS, B_SE2, B_SE5) of the plurality of axial bore holes positioned within the third axial section (W3) are uniformly distributed in a cross-section of the third axial section (W3) of the shaft (W).
3. A transmission (G) for a motor vehicle, comprising the shaft (W) of claim 1.
4. The transmission (G) of claim 3, wherein an input shaft of the transmission (G) comprises the shaft (W).
5. The transmission (G) of claim 3, further comprising:
a hydrodynamic torque converter (TC) including a hydraulically actuatable torque converter lockup clutch (WK); and
a plurality of hydraulically actuatable shift elements (SE1, SE2, SE3, SE4, SE5), wherein a gear implementation of the transmission (G) is controllable via selective actuation of the plurality of shift elements (SE1, SE2, SE3, SE4, SE5),
wherein a first bore hole of the plurality of axial bore holes (B2, B3) of the shaft (W) supplies fluid to the hydrodynamic torque converter (TC) or for actuating the torque converter lockup clutch (WK), the first bore hole of the plurality of axial bore holes (B2, B3) extending in the first axial section (W1) of the shaft (W), and
wherein a second bore hole of the plurality of axial bore holes (B_SE2, B_SE5) of the shaft (W) supplies fluid for actuating at least one of the plurality of shift elements (SE2, SE5), the second bore hole of the plurality of axial bore holes (B_SE2, B_SE5) extending in the third axial section (W1) of the shaft (W).
6. The transmission (G) of claim 5, further comprising a hydraulically actuatable separating clutch (K0), which is operable to connect an input hub (AN) of the transmission (G) and the hydrodynamic torque converter (TC), wherein a third bore hole of the plurality of axial bore holes (B4) of the shaft (W) supplies fluid for actuating the separating clutch (K0), the third bore hole of the plurality of axial bore holes (B4) extending in the first axial section (W1) of the shaft (W).

7. The transmission (G) of claim 5, wherein a fourth bore hole of the plurality of axial bore holes (B1) extends in the first axial section (W1) and a fifth bore hole of the plurality of axial bore holes (B1_RS) extends in the third axial section (W3), the fourth and fifth bore holes of the plurality of axial bore holes (B1, B1_RS) supplying lubricating oil to components of the transmission (G).

8. A drivetrain for a motor vehicle, comprising the transmission (G) of claim 3.

9. A shaft (W) for a motor vehicle transmission (G), comprising:
only four axial bore holes (B1a, B2a, B3a, B4a) positioned within the shaft (W) and configured to guide fluid within the shaft (W); and
a first axial section (W1), a second axial section (W2), and a third axial section (W3), the second axial section (W2) being axially between the first axial section (W1) and the third axial section (W3),
wherein fluid is supplied to the four axial bore holes (B1a, B2a, B3a, B4a) in the second axial section (W2),
wherein the fluid exits from the four axial bore holes (B1a, B2a, B3a, B4a) at the first axial section (W1) and at the third axial section (W3),
wherein two bore holes of the four axial bore holes (B1a, B2a) are at least partially in the first axial section (W1) and another two bore holes of the four axial bore holes (B3a, B4a) are at least partially in the third axial section (W3), at least one bore hole (B1a) of the two bore holes (B1a, B2a) at least partially in the first axial section (W1) being radially spaced from an axis of rotation (WA) of the shaft (W), and
wherein each of the two bore holes (B1a, B2a) at least partially in the first axial section (W1) is coaxial with a respective one of the other two bore holes (B3a, B4a) at least partially in the third axial section (W3).

10. A transmission (G) for a motor vehicle, comprising the shaft (W) of claim 9.

11. A drivetrain for a motor vehicle, comprising the transmission (G) of claim 10.

12. A shaft (W) for a motor vehicle transmission (G), comprising:
only six axial bore holes (B1a, B2a, B3a, B4a, B5a, B6a) positioned within the shaft (W) and configured to guide fluid within the shaft (W); and
a first axial section (W1), a second axial section (W2), and a third axial section (W3), the second axial section (W2) being axially between the first axial section (W1) and the third axial section (W3),
wherein fluid is supplied to the six axial bore holes (B1a, B2a, B3a, B4a, B5a, B6a) in the second axial section (W2),
wherein the fluid exits from the six axial bore holes (B1a, B2a, B3a, B4a, B5a, B6a) at the first axial section (W1) and at the third axial section (W3),
wherein three bore holes (B1a, B2a, B5a) of the six axial bore holes (B1a, B2a, B3a, B4a, B5a, B6a) are at least partially in the first axial section (W1) and another three bore holes (B3a, B4a, B6a) of the six axial bore holes (B1a, B2a, B3a, B4a, B5a, B6a) are at least partially in the third axial section (W3), with at least one bore hole (B1a) of the three bore holes (B1a, B2a, B5a) at least partially in the first axial section (W1) being radially spaced from an axis of rotation (WA) of the shaft (W),
wherein each of the three bore holes (B1a, B2a, B5a) at least partially in the first axial section (W1) is coaxial with a respective one of the other three bore holes (B3a, B4a, B6a) at least partially in the third axial section (W3).

13. A transmission (G) for a motor vehicle, comprising the shaft (W) of claim 12.

14. A drivetrain for a motor vehicle, comprising the transmission (G) of claim 13.

15. A transmission (G) for a motor vehicle, comprising:
a shaft (W), the shaft (W) having:
a plurality of axial bore holes (B1, B2, B3, B4, B1RS, B_SE2, B_SE5, B1a, B2a, B3a, B4a, B5a, B6a) positioned within the shaft (W) and configured to guide fluid within the shaft (W); and
a first axial section (W1), a second axial section (W2), and a third axial section (W3), the second axial section (W2) being axially between the first axial section (W1) and the third axial section (W3),
wherein fluid is supplied to the plurality of axial bore holes (B1, B2, B3, B4, B1RS, B_SE2, B_SE5, B1a, B2a, B3a, B4a, B5a, B6a) in the second axial section (W2),
wherein the fluid exits from the plurality of axial bore holes (B1, B2, B3, B4, B1RS, B_SE2, B_SE5, B1a, B2a, B3a, B4a, B5a, B6a) at the first axial section (W1) and at the third axial section (W3),
wherein one of the plurality of axial bore holes (B2; B1, B1a) is arranged, at least partially, in the first axial section (W1) and is radially spaced from an axis of rotation (WA) of the shaft (W),
wherein another of the plurality of axial bore holes (B1RS; B_SE5, B3a) is arranged, at least partially, in the third axial section (W3), and
wherein the one of the plurality of axial bore holes (B2; B1, B1a) is coaxial with the other of the plurality of axial bore holes (B1RS; B_SE5, B3a);
a hydrodynamic torque converter (TC) including a hydraulically actuatable torque converter lockup clutch (WK); and
a plurality of hydraulically actuatable shift elements (SE1, SE2, SE3, SE4, SE5), wherein a gear implementation of the transmission (G) is controllable via selective actuation of the plurality of shift elements (SE1, SE2, SE3, SE4, SE5),
wherein a first bore hole of the plurality of axial bore holes (B2, B3) of the shaft (W) supplies fluid to the hydrodynamic torque converter (TC) or for actuating the torque converter lockup clutch (WK), the first bore hole of the plurality of axial bore holes (B2, B3) extending in the first axial section (W1) of the shaft (W), and
wherein a second bore hole of the plurality of axial bore holes (B_SE2, B_SE5) of the shaft (W) supplies fluid for actuating at least one of the plurality of shift elements (SE2, SE5), the second bore hole of the plurality of axial bore holes (B_SE2, B_SE5) extending in the third axial section (W1) of the shaft (W).

16. A drivetrain for a motor vehicle, comprising the transmission (G) of claim 15.

* * * * *